United States Patent [19]

Kuroda

[11] Patent Number: 5,513,520
[45] Date of Patent: May 7, 1996

[54] COMBUSTION STATE-DETERMINING SYSTEM FOR INTERNAL COMBUSTION ENGINES

[75] Inventor: Shigetaka Kuroda, Wako, Japan

[73] Assignee: Honda Giken Kogyo Kabushiki Kaisha, Tokyo, Japan

[21] Appl. No.: 295,532

[22] Filed: Aug. 25, 1994

[30] Foreign Application Priority Data

Aug. 26, 1993 [JP] Japan .................... 5-234116

[51] Int. Cl.$^6$ .................................. G01M 15/00
[52] U.S. Cl. .......................... 73/117.3; 73/116
[58] Field of Search ................... 73/116, 117.3

[56] References Cited

U.S. PATENT DOCUMENTS 5,287,836  2/1994  Shimasaki et al. ............... 123/406
5,343,844  9/1994  Fukui et al. ....................... 73/116
5,359,882  11/1994  Fukui ............................... 73/117.3

FOREIGN PATENT DOCUMENTS 4-209949  7/1992  Japan .

Primary Examiner—Hezron E. Williams
Assistant Examiner—Max H. Noori
Attorney, Agent, or Firm—Nikaido, Marmelstein, Murray & Oram

[57] ABSTRACT

A combustion state-determining system for an internal combustion engine, includes an ECU which detects misfires occurring in the engine, calculates a rate of misfire occurrence every predetermined number of firing cycles, based on the detected misfires, and determines that the engine is in a misfiring state when the calculated rate of misfire occurrence exceeds a predetermined reference rate. Further, a temperature state of the engine is detected, and the predetermined reference rate is changed based on the detected temperature state.

4 Claims, 12 Drawing Sheets

| FIG.9A |
|---|
| FIG.9B |

COMBUSTION STATE-DETERMINING SYSTEM FOR INTERNAL COMBUSTION ENGINES

BACKGROUND OF THE INVENTION

1. Field of the Invention

This invention relates to a combustion state-determining system for internal combustion engines, which detects misfires occurring in the engine, to thereby determine a state of combustion of the engine, based on the state of occurrence of misfires.

2. Prior Art

Conventionally, a misfire-determining system for internal combustion engines is known, for example, by Japanese Provisional Patent Publication (Kokai) No. 4-209949, which detects misfires occurring in the engine and determines that the combustion state of the engine is degraded (the engine is in a misfiring state) when misfires have occurred in the engine at a predetermined reference rate or more whenever the engine rotates a predetermined number of times, wherein the predetermined reference rate is set based on the rotational speed and intake pipe absolute pressure of the engine.

In the above conventional system, however, the predetermined reference rate is set on the premise that the engine has been warmed up. As a result, the system has the following inconveniences: That is, when the temperature of the engine is low, a transient misfiring state can sometimes occur due to enrichment of the air-fuel ratio of a mixture supplied to the engine or smoldering of spark plugs thereof. Consequently, the above transient misfiring state can be erroneously determined to be a continuous or steady misfiring state caused by an abnormality of the engine or the misfire-determining system (system abnormality).

In addition, after completion of warming-up of the engine, if the engine is restarted shortly after the engine operation is stopped (high-temperature restarting), fuel present in a fuel supply passage of the engine boils to generate bubbles. The thus generated bubbles cause insufficiency in the amount of fuel supplied to the cylinders, which can result in a transient misfiring state, similarly to the former case. In this case as well, the above conventional system erroneously determines that the engine is in a misfiring state caused by a system abnormality.

SUMMARY OF THE INVENTION

It is the object of the invention to provide a combustion state-determining system for internal combustion engines, which is capable of more accurately determining a combustion state of the engine, while preventing such a misjudgment that a transient misfiring state occurring during a cold or hot condition of the engine, such as at the start of the engine, is a continuous misfiring state caused by a system abnormality.

To attain the above object, the present invention provides a combustion state-determining system for an internal combustion engine, including misfire-detecting means for detecting misfires occurring in the engine, misfiring rate-calculating means for calculating a rate of misfire occurrence every predetermined number of firing cycles, based on the misfires detected by the misfire-detecting means, and combustion state-determining means for determining that the engine is in a misfiring state when the rate of misfire occurrence calculated by the misfiring rate-calculating means exceeds a predetermined reference rate, the improvement comprising:

temperature state-detecting means for detecting a temperature state of the engine; and reference rate-changing means for changing the predetermined reference rate, based on the temperature state of the engine detected by the temperature state-detecting means.

Preferably, the temperature state-detecting means detects at least one of coolant temperature of the engine and intake air temperature of the engine.

More preferably, the predetermined reference rate is determined based on operating conditions of the engine.

In a preferred embodiment, the reference rate-changing means sets the predetermined reference rate to a larger value in one of predetermined low and high temperature regions of the intake air temperature of the engine than a value in a predetermined medium temperature region of the intake air temperature of the engine, and to a larger value in one of predetermined low and high temperature regions of the coolant temperature of the engine than a value in a predetermined medium temperature region of the coolant temperature of the engine.

Preferably, the reference rate-changing means sets the predetermined reference rate to larger values as the coolant temperature of the engine decreases in the predetermined low temperature region of the coolant temperature of the engine.

The above and other objects, features, and advantages of the invention will be more apparent from the following detailed description taken in conjunction with the accompanying drawings.

BRIEF DESCRIPTION OF THE DRAWINGS

FIGS. 2A and 2B are flowcharts showing programs (main routines) for determining a state of combustion of the engine, in which:

FIG. 2A shows a CRK processing which is executed in synchronism with generation of a crank angle (CRK) signal; and FIG. 2B shows a TDC processing which is executed in synchronism with generation of a top dead center (TDC) signal;

DETAILED DESCRIPTION

The invention will now be described in detail with reference to the drawings showing an embodiment thereof.

Figure 1:
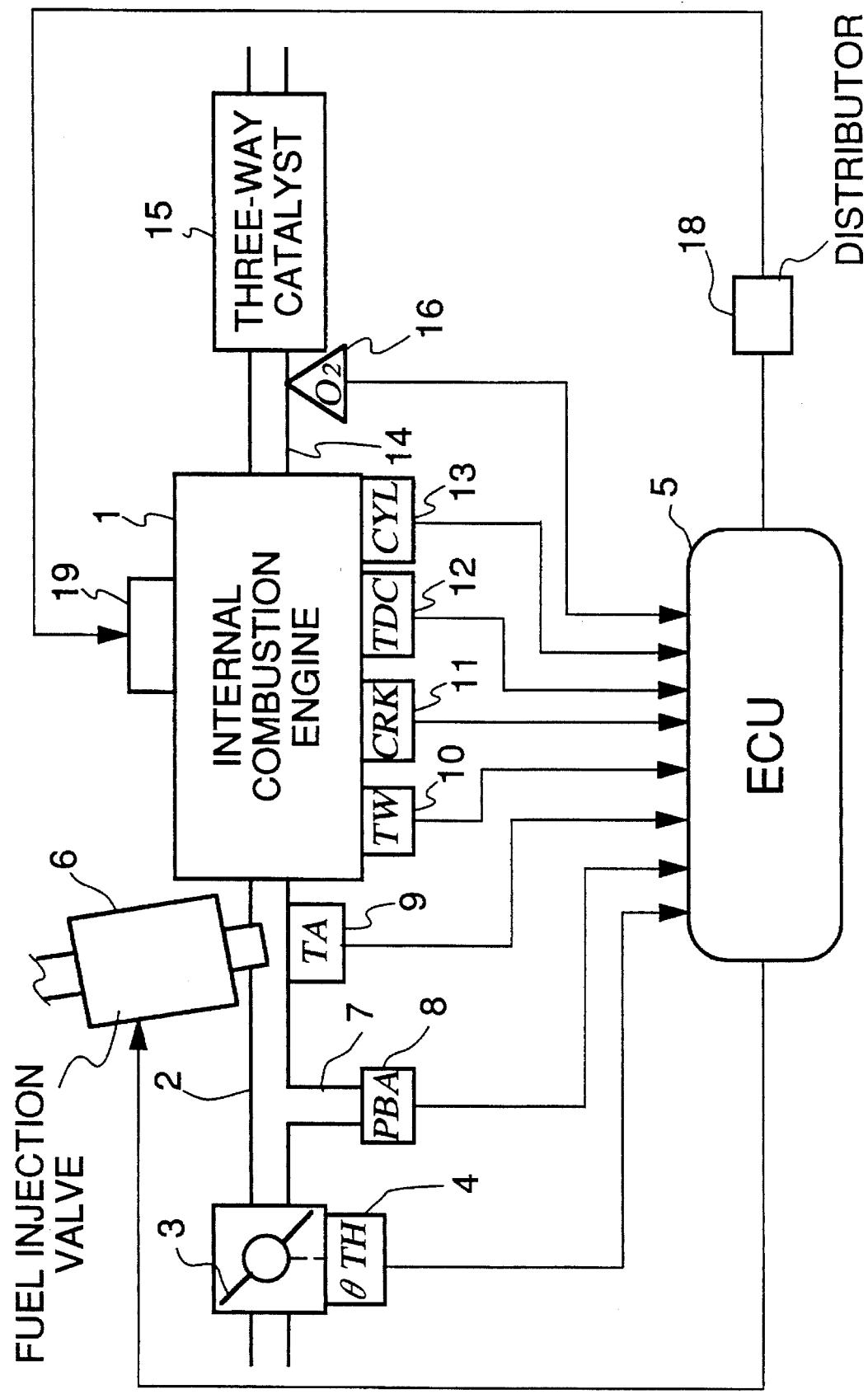
FIG. 1 is a block diagram schematically showing the whole arrangement of an internal combustion engine and a combustion state-determining system therefor, according to an embodiment of the invention.

Referring first to FIG. 1, there is shown the whole arrangement of an internal combustion engine and a combustion state-determining system therefor, according to an embodiment of the invention. In an intake pipe 2 of the engine 1, there is arranged a throttle valve 3, to which is connected a throttle valve opening ($\theta$TH) sensor 4 for generating an electric signal indicative of the sensed throttle valve opening and supplying the same to an electronic control unit (hereinafter referred to as "the ECU") 5.

Fuel injection valves 6 are provided, respectively, for cylinders of the engine 1 and each arranged in the intake pipe 2 at a location between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided in communication with the interior of the intake pipe 2 via a conduit 7 at a location immediately downstream of the throttle valve 3, for supplying an electric signal indicative of the sensed absolute pressure PBA to the ECU 5. An intake air temperature (TA) sensor 9 is inserted into the intake pipe 2 at a location downstream of the intake pipe absolute pressure sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1 for supplying an electric signal indicative of the sensed engine coolant temperature TW to the ECU 5.

A cylinder-discriminating sensor (hereinafter referred to as "the CYL sensor") 13, a top dead point (TDC) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "CYL signal pulses") at a predetermined crank angle of a particular cylinder of the engine 1. The TDC sensor 12 generates a TDC signal pulse at a predetermined crank angle before a top dead point (TDC) of each cylinder corresponding to the start of the intake stroke of the cylinder (e.g. whenever the crankshaft rotates through 180 degrees in the case where the engine is of the 4-cylinder type). The CRK sensor 11 generates crank angle pulses (hereinafter referred to as "CRK signal pulses") at predetermined crank angles with a repetition period shorter than the repetition period of TDC signal pulses (e.g. whenever the crankshaft rotates through 30 degrees). The CYL signal pulses, TDC signal pulses, and CRK signal pulses are supplied to the ECU 5.

Arranged in each cylinder of the engine 1 is a spark plug 19, which is electrically connected via a distributor 18 to the ECU 5.

A three-way catalyst 15 is arranged in an exhaust pipe 14 of the engine 1 for purifying components of HC, CO, NOx, and the like present in exhaust gases. Arranged in the exhaust pipe 14 at a location upstream of the three-way catalyst 15 is an oxygen concentration sensor 16 (hereinafter referred to as "the 02 sensor") as an air-fuel ratio sensor, for detecting the concentration of oxygen present in exhaust gases at the location, and supplying a signal indicative of the sensed oxygen concentration to the ECU 5.

The ECU 5 is comprised of an input circuit having the function of shaping the waveforms of input signals from various sensors mentioned above, shifting the voltage levels of sensor output signals to a predetermined level, converting analog signals from analog-output sensors to digital signals, and so forth, a central processing unit (hereinafter referred to as "the CPU"), memory means storing various operational programs which are executed by the CPU and for storing results of calculations therefrom, etc., and an output circuit which outputs driving signals to the fuel injection valves 6.

The CPU of the ECU 5 operates in response to the above-mentioned various engine parameter signals from the various sensors to determine operating conditions in which the engine 1 is operating, and calculates, based upon the determined engine operating conditions, a fuel injection period for each of the fuel injection valves 6 in synchronism with generation of TDC signal pulses, and ignition timing for each spark plug 19, to supply signals for driving the fuel injection valves 6 and the spark plugs 19 from the output circuit.

Figure 2A:
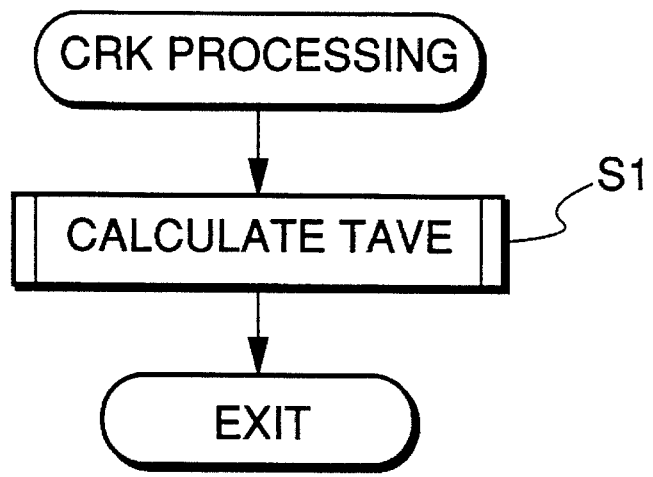
Figure 2B:
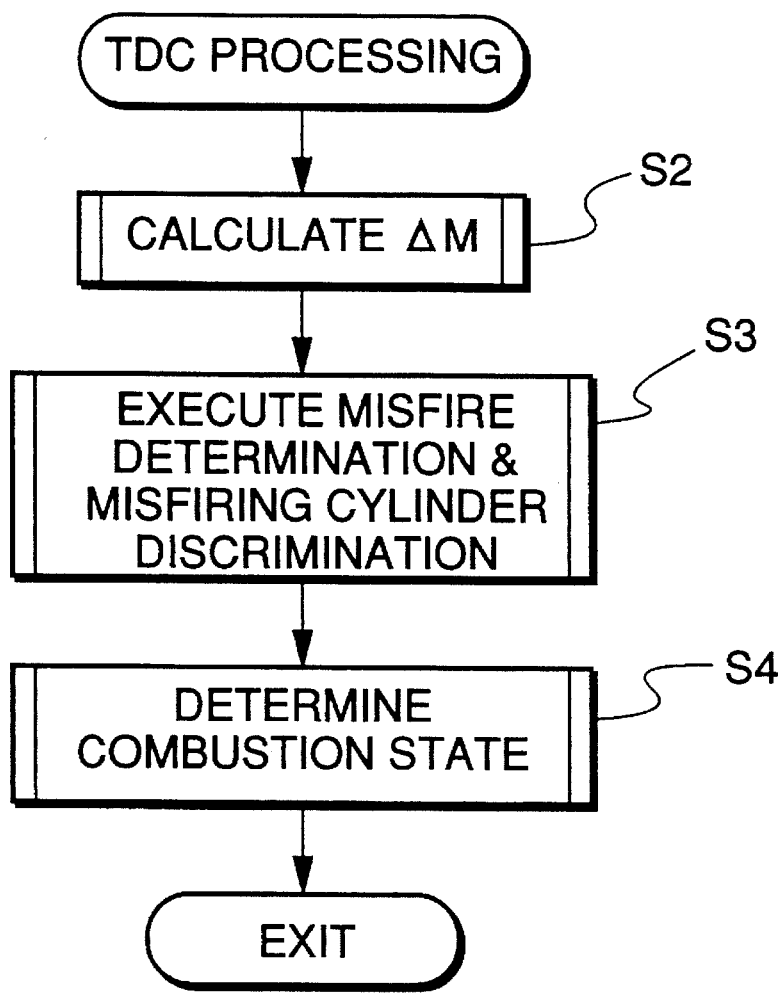

FIGS. 2A and 2B show main routines for determining a state of combustion of the engine 1, which are executed by the CPU of the ECU 5.

FIG. 2A shows a CRK processing carried out in synchronism with generation of CRK signal pulses. At a step S1 in the figure, an average value TAVE (hereinafter referred to as "the first average value") of time intervals of occurrence of CRK signal pulses is calculated. The time intervals are proportional to the reciprocal of the engine rotational speed.

FIG. 2B shows a TDC processing carried out in synchronism with generation of TDC signal pulses. In the present processing, a rate of variation $\Delta M$ in an average value M (hereinafter referred to as "the second average value") of the first average values TAVE calculated in the above CRK processing is obtained at a step S2, and then, based on the thus obtained $\Delta M$ value, it is determined at a step S3 whether or not a misfire has occurred in the engine and which cylinder has misfired. Further, it is determined at a step S4 whether or not the engine is in an abnormal combustion state, based on the number of times of misfire occurrence determined as above.

Figure 3:
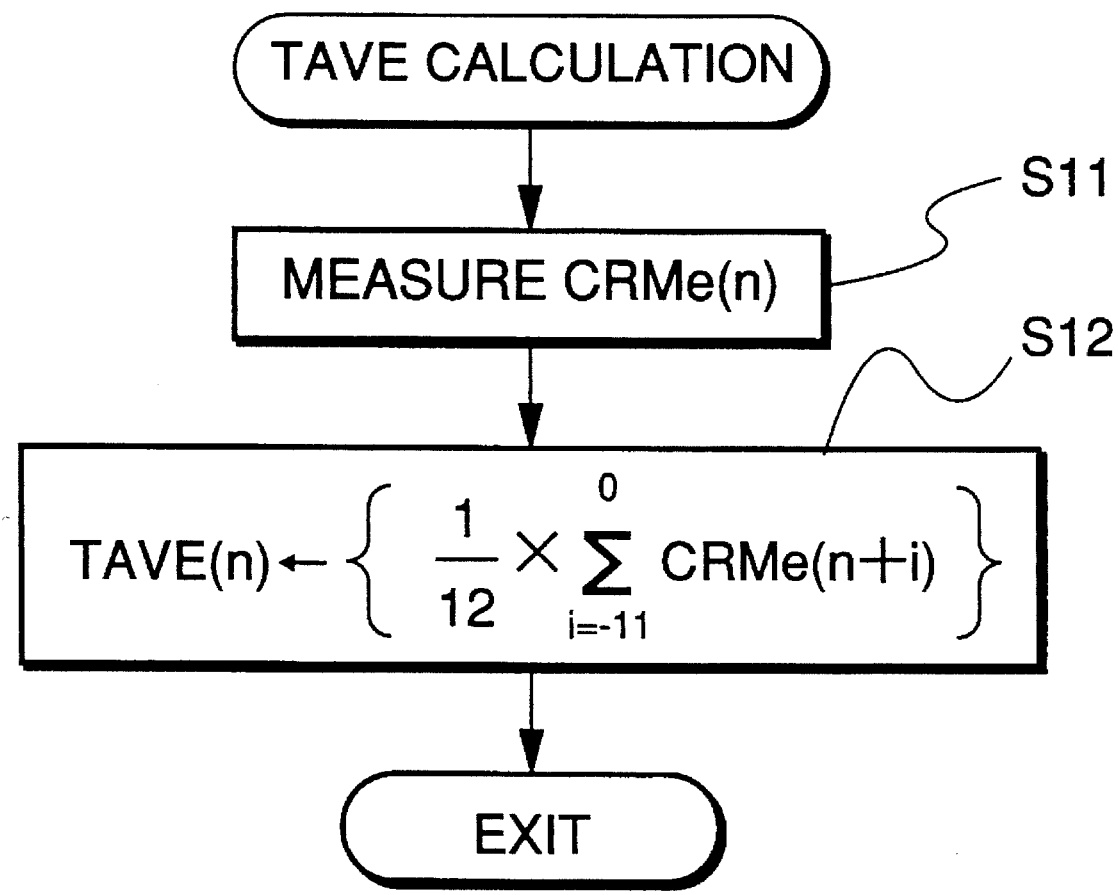
FIG. 3 is a flowchart showing a subroutine for calculating a first average value TAVE, which is executed during execution of the FIG. 2A program.

FIG. 3 shows a subroutine for calculating the first average value TAVE, which is executed at the step S1 of the FIG. 2A program.

Figure 4:
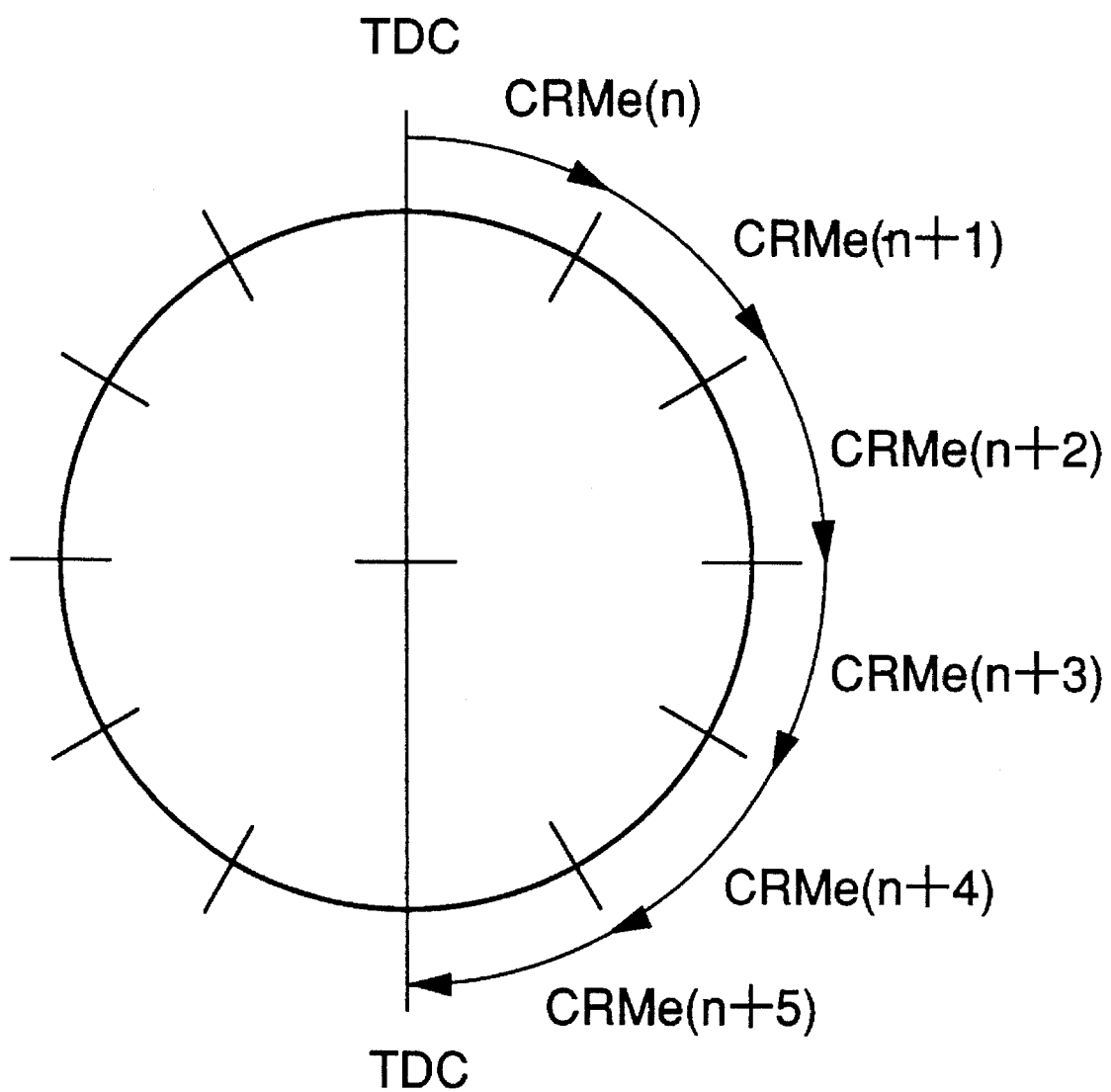
FIG. 4 is a diagram showing the relationship between measurement of a parameter CRMe representative of the engine rotational speed and the rotational angle of the crankshaft.

At a step S11, time intervals CRMe(n) of occurrence of CRK signal pulses are calculated. More specifically, time interval values of CRMe(n), CRMe(n+1), CRMe(n+2) ... are successively measured whenever the crankshaft rotates through 30 degrees, as shown in FIG. 4.

At a step S12, a first average value TAVE(n) is calculated, which is an average value of 12 CRMe values from a value CRMe(n−11) measured eleven loops before the present loop to a value CRMe(n) in the present loop, by the use of the following equation (1):

$$TAVE(n) = 1/12 \times \sum_{i=-11}^{0} CRMe(n+i) \quad (1)$$

In the present embodiment, since CRK signal pulses are each generated whenever the crankshaft rotates through 30 degrees, the first average value TAVE(n) is obtained over one rotation of the crankshaft. The first average value TAVE(n) obtained by such averaging every period of one rotation of the crankshaft is free of the influence of primary vibration components in engine rotation over a period of one rotation of the crankshaft, i.e. noise components due to dimensional errors (such as manufacturing tolerances and mounting tolerances) of a pulser or a pickup forming the crank angle sensor 11.

The engine rotational speed NE is also calculated based on the TAVE(n) value.

Figure 5:
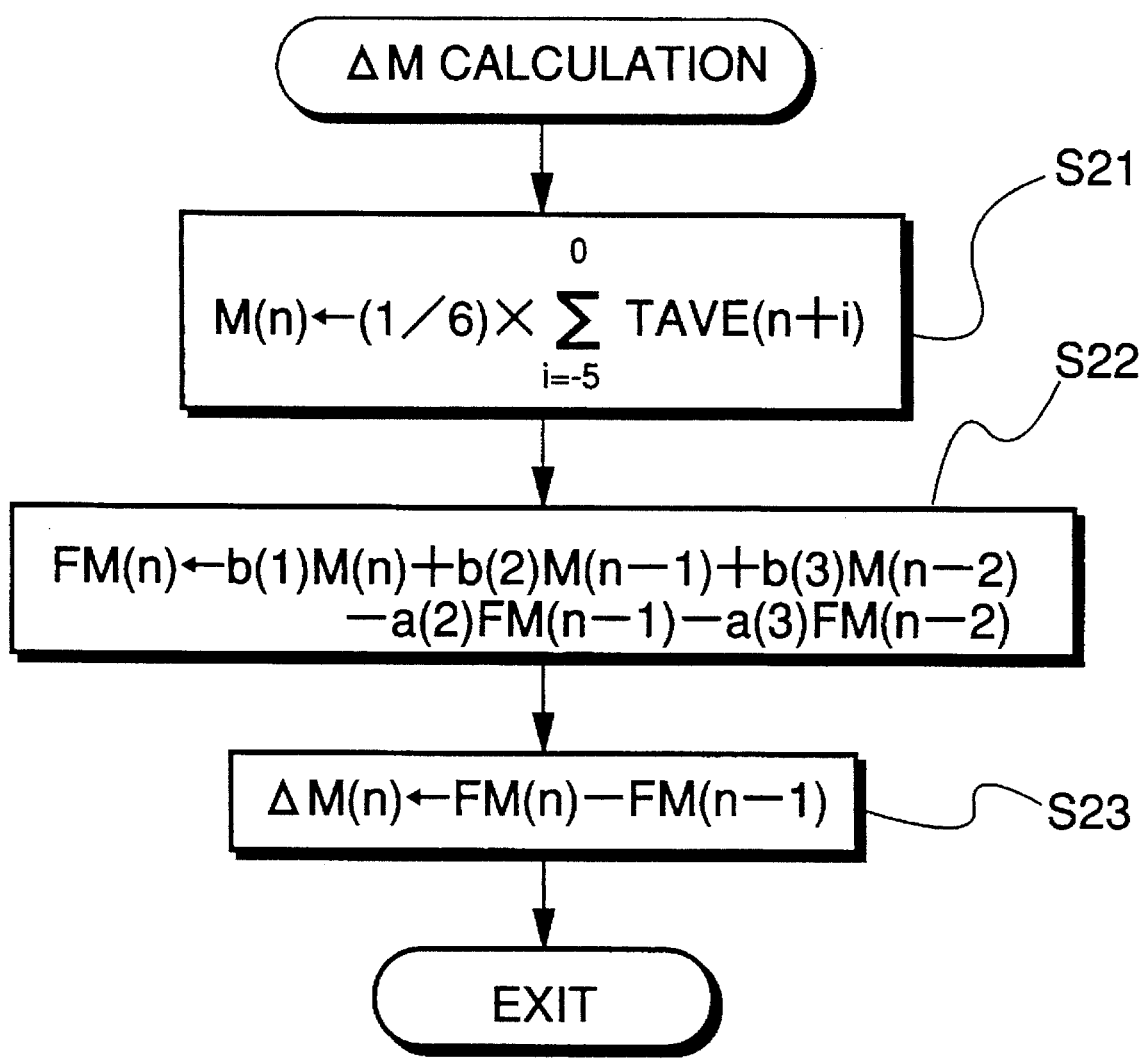
FIG. 5 is a flowchart showing a subroutine for calculating a parameter ΔM representative of a rate of variation in the engine rotational speed, which is executed during execution of the FIG. 2B program.

FIG. 5 shows a subroutine for calculating the rate of variation $\Delta M$, which is executed at the step S2 of the FIG. 2B program.

At a step S21, a second average value M(n) is calculated by averaging six TAVE values from a value TAVE(n−5) obtained five loops before the present loop to a value TAVE(n) in the present loop, by the use of the following equation (2):

$$M(n) = 1/6 \times \sum_{i=-5}^{0} TAVE(n+i) \quad (2)$$

In the present embodiment, the engine 1 is a 4-cylinder/4-cycle engine wherein spark ignition is carried out at any one of the cylinders (#1 cylinder to #4 cylinder) whenever the crankshaft rotates through 180 degrees. Therefore, the second average value M(n) is obtained from the first average value TAVE(n) over one firing period. The second average value M(n) obtained by such averaging per ignition cycle is free of secondary vibration components representing a variation in torque of the engine due to combustion, i.e. vibration components in engine rotation over a period of a half rotation of the crankshaft.

At the following step S22, the second average value M(n) thus calculated is subjected to high-pass filtering by the use of the following equation (3), to obtain a high-pass filtered second average value FM(n):

$$FM(n)=b(1)\times M(n)+b(2)\times M(n-1)+b(3)\times M(n-2)-a(2)FM(n-1)-a(3)FM(n-2) \quad (3)$$

where b(1) to b(3), a(2), and a(3) represent filter transmission coefficients, which assume, for example, 0.2096, −0.4192, 0.2096, 0.3557, and 0.1940, respectively. When in the equation (3) assumes 0 or 1, FM(0) and FM(1) are set to zero, and therefore, the equation (3) is effectively applied when n assumes a value of 2 or more.

Figure 6:
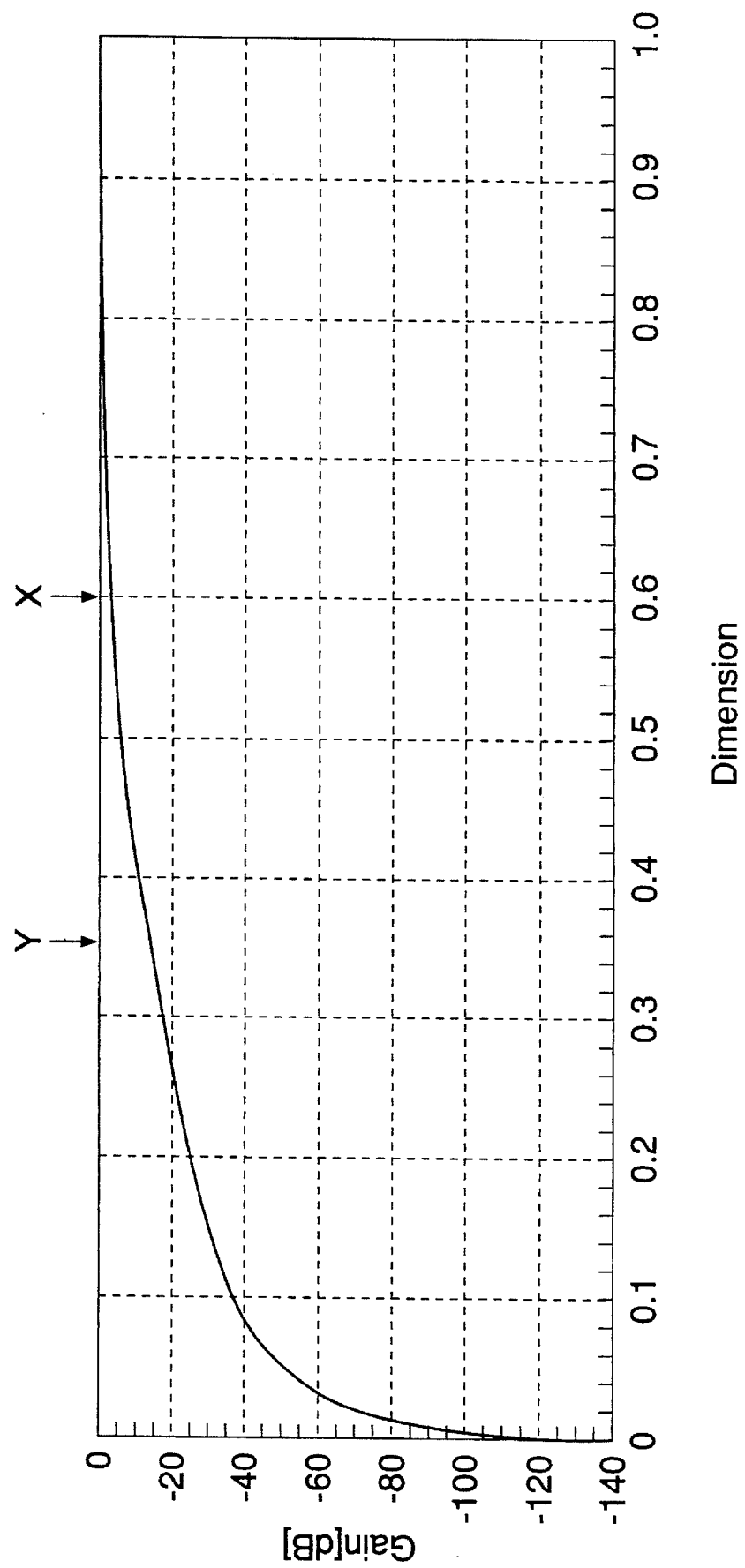
FIG. 6 is a graph showing an attenuation characteristic of a high-pass filter employed in the present embodiment.
Figure 7:
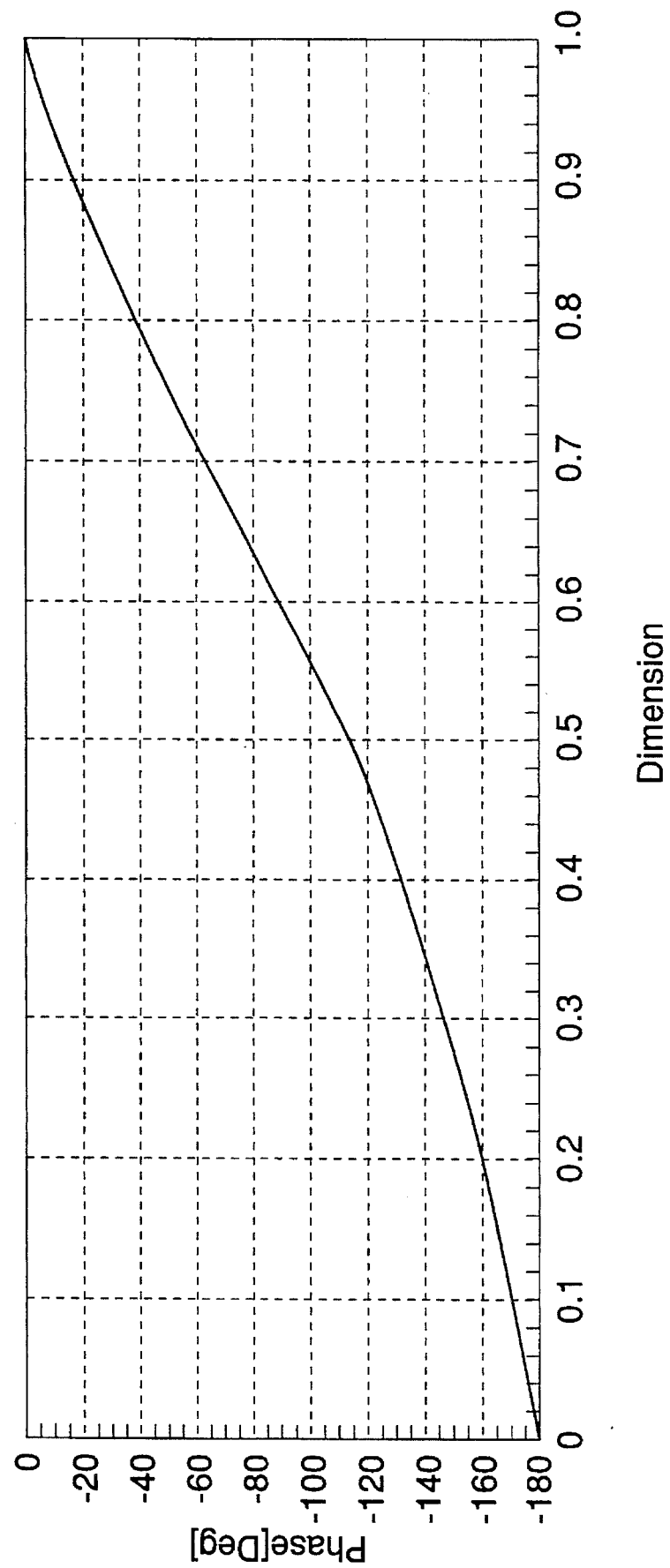
FIG. 7 is a graph showing a phase delay characteristic of the high-pass filter.

A high-pass filter, employed in the present embodiment, having a transmission characteristic represented by the equation (3) has an attenuation characteristic as shown in FIG. 6, and a phase delay characteristic as shown in FIG. 7. As shown in FIG. 6, the filter exhibits an attenuation characteristic of −3 dB or more at 0.6 within the Nyquist frequency range, as indicated by the arrow X, and −14 dB or more at 0.35 within the Nyquist frequency range, as indicated by the arrow Y, and its output signal has a phase delay as shown in FIG. 7. By the use of the filter with such characteristics, low frequency components contained in the second average value M(n) are attenuated and the high-pass filtered second average value FM(n) has a phase delay relative to the second average value M(n).

The high-pass filtered second average value FM(n) obtained as above is free of frequency components lower than about 10 Hz contained in the M(n) value, to thereby eliminate the adverse effect of vibrations (e.g. vibrations due to torsion of the crankshaft and road surface vibrations transmitted through wheels of a vehicle on which the engine is installed) transmitted from a driving system of the vehicle to the engine.

At a step S23, a rate of variation $\Delta M(n)$ in the high-pass filtered second average value FM(n) is calculated by the use of the following equation (4):

$$\Delta M(n)=FM(n)-FM(n-1) \quad (4)$$

It has been empirically ascertained that after high-pass filtering using the above high-pass filter, those frequency components which have increased variation amounts upon occurrence of a misfire have increased phase delay amounts such that the filtered value FM(n) is inverted in sign. In the present embodiment, when a misfire has occurred in the engine, the high-pass filtered value FM(n) is inverted in sign from that of the M(n) value. In the first loop immediately after occurrence of a misfire, the sign of the FM(n) value is not inverted due to b(1) being positive, but in the subsequent loops M(n) becomes M(n−1) or M(n−2), so that the FM(n) value is inverted or has a negative sign. Thus, in the event of occurrence of a misfire, the M(n) value increases, so that the FM(n) value increases in the negative direction.

Figure 8:
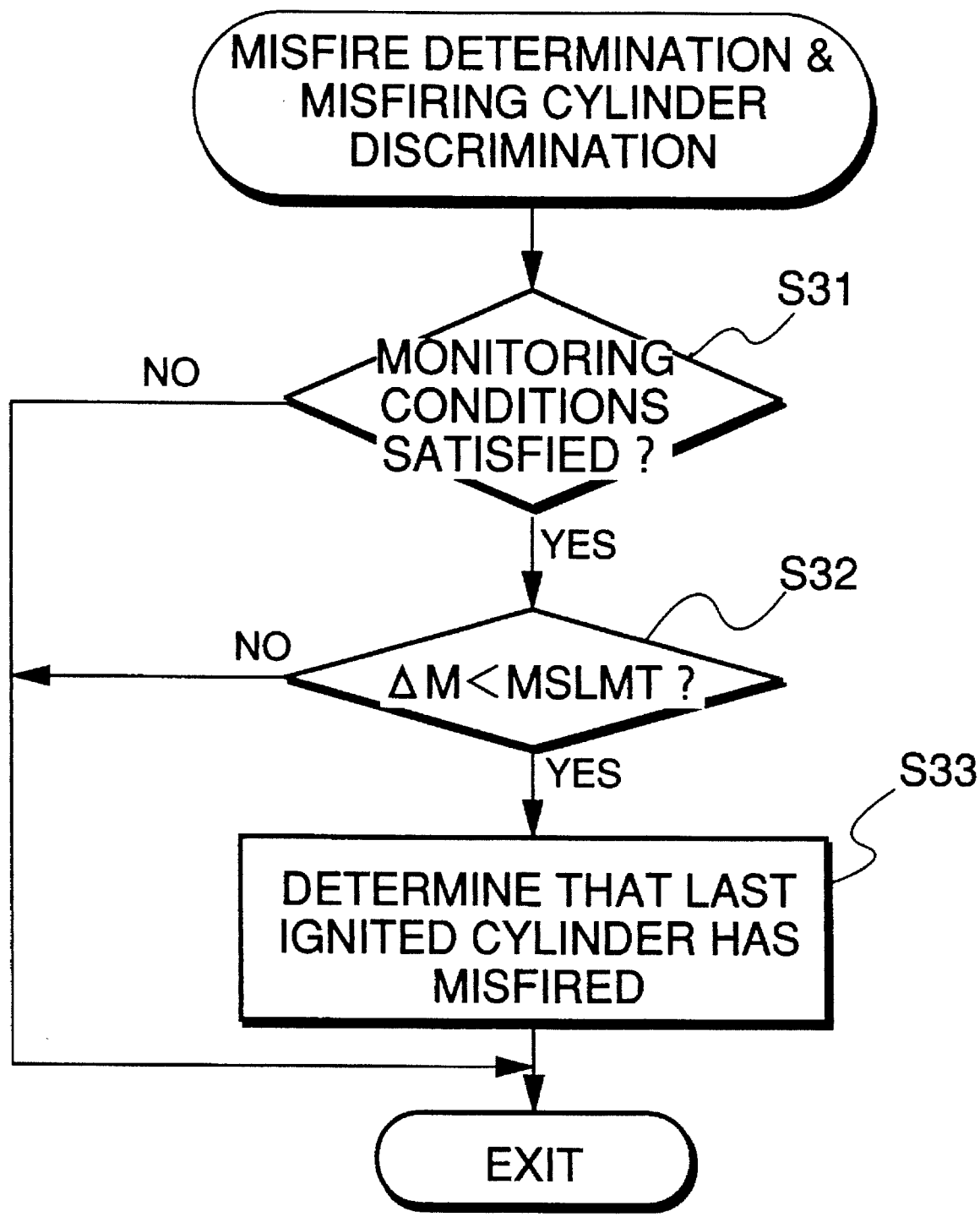
FIG. 8 is a flowchart showing a subroutine for executing a misfire determination and a misfiring cylinder discrimination, which is executed during execution of the FIG. 2B program.

FIG. 8 shows a subroutine for carrying out the misfire determination and the misfiring cylinder discrimination, based on the rate of change $\Delta M$ calculated as above.

At a step S31, it is determined whether or not the aforesaid monitoring conditions are satisfied, i.e. whether or not the misfire determination can be executed. The monitoring conditions are satisfied, for example, when the operating condition of the engine is steady, and at the same time the engine coolant temperature TW, the intake air temperature TA, and the engine rotational speed NE, etc. fall within respective predetermined ranges.

If the monitoring conditions are not satisfied, the present program is immediately terminated. On the other hand, if the monitoring conditions are satisfied, the program proceeds to a step S32, wherein it is determined whether or not the rate of variation $\Delta M$ is smaller than a predetermined negative value MSLMT, i.e. whether or not $|\Delta M|>|MSLMT|$ stands. The predetermined negative value MSLMT is read from a map which is set in accordance with the engine rotational speed NE and the engine load (intake pipe absolute pressure PBA). The absolute value of the MSLMT value is set to a smaller value as the engine rotational speed NE increases, and set to a larger value as the engine load increases.

If the answer to the question at the step S32 is negative (NO), i.e. if $\Delta M \geq$ MSLMT stands, the program is immediately terminated. On the other hand, if the answer to the question at the step S32 is affirmative (YES), i.e. if $\Delta<$MSLMT stands, it is determined at a step S33 that a misfire has occurred in a cylinder where spark ignition took place in the loop before the last loop. This is because, as described hereinabove, a value $\Delta M(n)$ increases in the negative direction when a misfire has occurred. The reason why it is determined that a misfire has occurred in the cylinder ignited in the loop before the last loop is that the high-pass filtering causes a delay in obtaining the second average value FM(n).

At the step S33, the count values of a first misfire counter nMFA and a second misfire counter nMFBC are both incremented by "1", and a flag FMFCYLn (n represents a number allotted to each of the cylinders) which indicates a misfiring cylinder is set to "1". These first and second misfire counters nMFA and nMFBC as well as the flag FMFCYLn are to be used in a program of FIG. 9, described hereafter.

Figures 9, 9A:
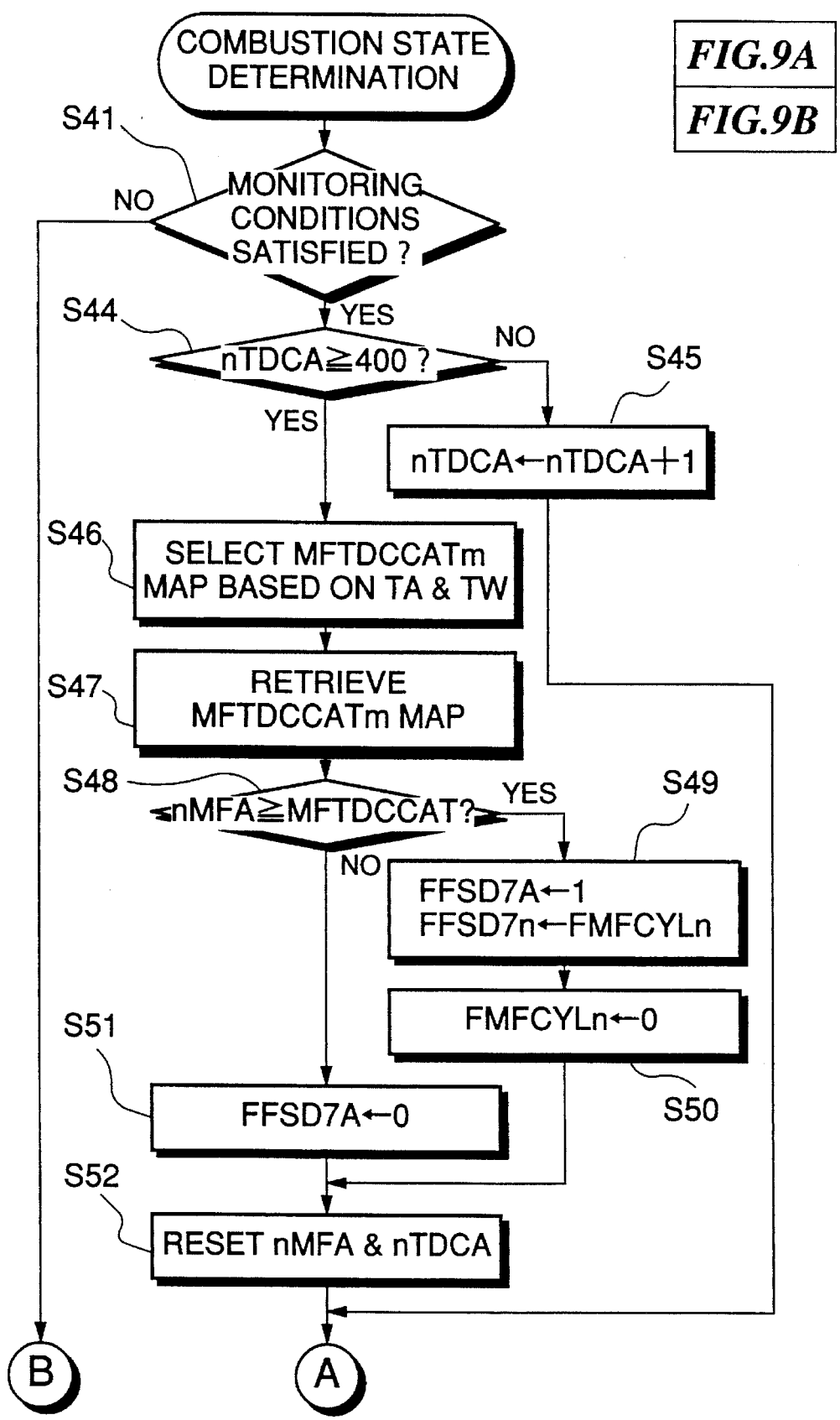
FIG. 9 is a flowchart showing a subroutine for determining a combustion state of the engine, which is executed during execution of the FIG. 2B program.
Figure 9B:
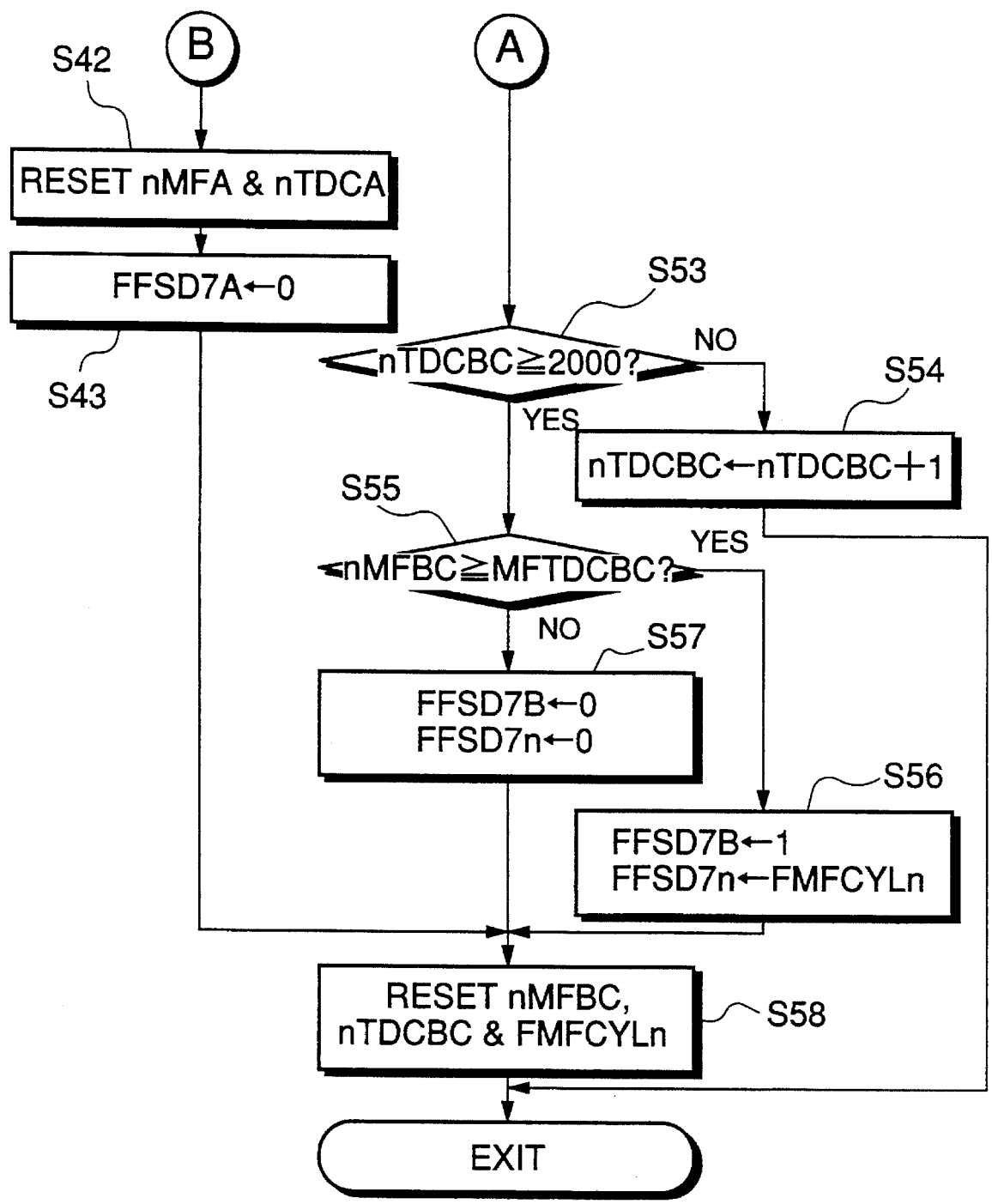

FIG. 9 shows a subroutine for determining the combustion state of the engine, based on the state of misfire occurrence, which is executed at the step S4 in FIG. 2B.

First, at a step S41, similarly to the step S31 in FIG. 8, it is determined whether or not the aforesaid monitoring conditions are satisfied. If the monitoring conditions are not satisfied, parameters to be used in the present program are initialized at steps S42, S43 and S58, followed by terminating the routine.

If the monitoring conditions are satisfied, it is determined at a step S44 whether or not the count value of the first TDC counter nTDCA is equal to or more than 400. If the count value thereof is smaller than 400, it is incremented by "1" at a step S45, and then the program proceeds to a step S53.

Figure 10:
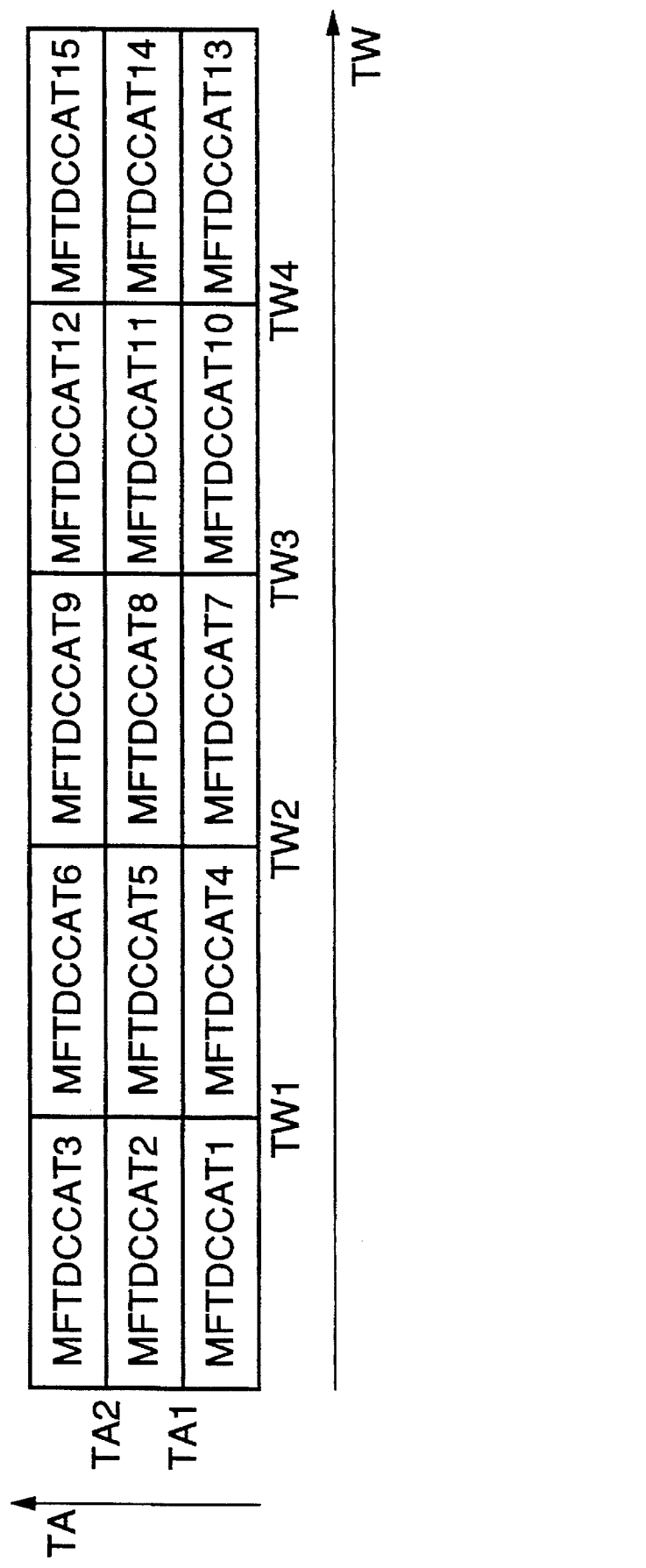
FIG. 10 shows a map which is used to calculate a reference value MFTDCCAT for determining a combustion state of the engine.

If the count value of the counter nTDCA becomes equal to or more than 400, the program proceeds to a step S46, wherein an MFTDCCATm map is selected in accordance with the intake air temperature TA and the engine coolant temperature TW. The MFTDCCATm map is set such that a first reference value MFTDCCAT to be used for determining a combustion state of the engine is set based on the engine rotational speed NE and the intake pipe absolute pressure PBA. As shown in FIG. 10, the MFTDCCATm map consists of maps MFTDCCAT1 to MFTDCCAT15, which are arranged in respective regions defined by predetermined values TA1 and TA2 of the intake air temperature TA and predetermined values TW1 -TW4 of the engine coolant temperature TW. Therefore, at the step S46, one of the maps MFTDCCAT1 to MFTDCCAT15 is selected based on the TA and TW values. For example, if TA$\leq$TA1 and TW$\leq$TW1 both stand, the MFTDCCAT1 map is selected, or if TA1>TA$\leq$TA2 and TW2>TW$\leq$TW3 both stand, the MFTDCCAT8 map is selected. Predetermined temperature values for defining each of the regions of the maps should be set, for example, to approximately $-5°$ C. and $60°$ C. for TA1 and TA2, respectively, and to approximately $-5°$ C., $20°$ C., $60°$ C. and $98°$ C. for TW1 to TW4, respectively.

With respect to the intake air temperature TA, the MFTDCCATm map is set such that the MFTDCCAT value is set to larger values in regions where TA$\leq$TA1 or TA <TA2 stands than values in regions where TA1>TA$\leq$TA2 stands. On the other hand, with respect to the engine coolant temperature TW, it is set such that the MFTDCCAT value is set to larger values in regions where TW$\leq$TW3 or TW>TW4 stands than values in regions where TW3<TW$\leq$TW4 stands. In the regions where TW $\leq$TW3 stands, the MFTDCCAT value is set to larger values as the TW value decreases.

The above setting enables preventing the combustion state-determining,system from making such a misjudgment that a transient misfiring state occurring when the engine is at a low temperature or restarted in a high-temperature condition is a continuous misfiring state caused by a system abnormality.

Then, at a step S47, the selected MFTDCCATm map is retrieved to read the first reference value MFTDCCAT in accordance with the detected engine rotational speed NE and the intake pipe absolute pressure PBA. Further, it is determined whether or not the count value of the first misfire counter nMFA which is incremented by "1" when a misfire has been detected at the step S33 in FIG. 8 and counts the number of times of misfire occurrence every 400 firing cycles is equal to or larger than the first reference value MFTDCCAT, at a step S48.

If nMFA $\geq$MFTDCCAT stands, it is determined that the engine is in a combustion state which adversely affects an exhaust system component part such as the three-way catalyst 15 (a misfiring state), and then a first abnormality flag FFSD7A which indicates occurrence of the above combustion state is set to "1", followed by updating a flag FFSD7n which indicates detection of a misfire in each of the cylinders, to a flag FMFCYLn indicating a misfiring cylinder, at a step S49. Further, the flag FMFCYLn is set to "0" at a step S50, and the count values of the counters nMFA and nTDCA are both reset to "0" at a step S52, followed by the program proceeding to the step S53. On the other hand, if nMFA < MFTDCCAT stands at the step S48, the first abnormality flag FFSD7A is set to "0" at a step S51, and then the program proceeds to the step S52.

At the step S53, it is determined whether or not the count value of a second TDC counter nTDCBC is equal to or more than 2000. If the count value is less than 2000, it is incremented by "1" at a step S54, followed by terminating the present routine.

If the count value of the counter nTDCBC is equal to or more than 2000, the program proceeds to a step S55, wherein it is determined whether or not the count value of the second misfire counter nMFBC which is incremented by "1" when a misfire has been detected at the step S33 in FIG. 8 and counts the number of times of misfire occurrence every 2000 firing cycles is equal to or more than a second reference value MFTDCBC.

If nMFBC$\geq$MFTDCBC stands, it is determined that the engine is in a combustion state which causes degradation of exhaust emission characteristics of the engine (a misfiring state), and then a second abnormality flag FFSD7B which indicates occurrence of the above degraded combustion state is set to "1", and the flag FFSD7n which indicates detection of a misfire in each of the cylinders is updated to the flag FMFCYLn indicating a misfiring cylinder, at a Step S56. Further, at a step S58, the count values of the counters nMFBC and nTDCBC are both reset to "0" and the flag FMFCYLn is set to "0", followed by terminating the present routine.

On the other hand, if nMFBC< MFTDCBC stands, the second abnormality flag FFSD7B and the misfiredetecting flag FFSD7n are both set to "0", and then the program proceeds to the step S58.

As described above, according to the program of FIG. 9, the first reference value MFTDCCAT is read from a map selected based on the intake air temperature TA and the engine coolant temperature TW, and therefore a misjudgment can be prevented that a transient misfiring state during a cold or hot condition of the engine such as at the start of the engine is a continuous misfiring state caused by a system abnormality. Thus, a combustion state of the engine can be more accurately determined.

Figure 11:
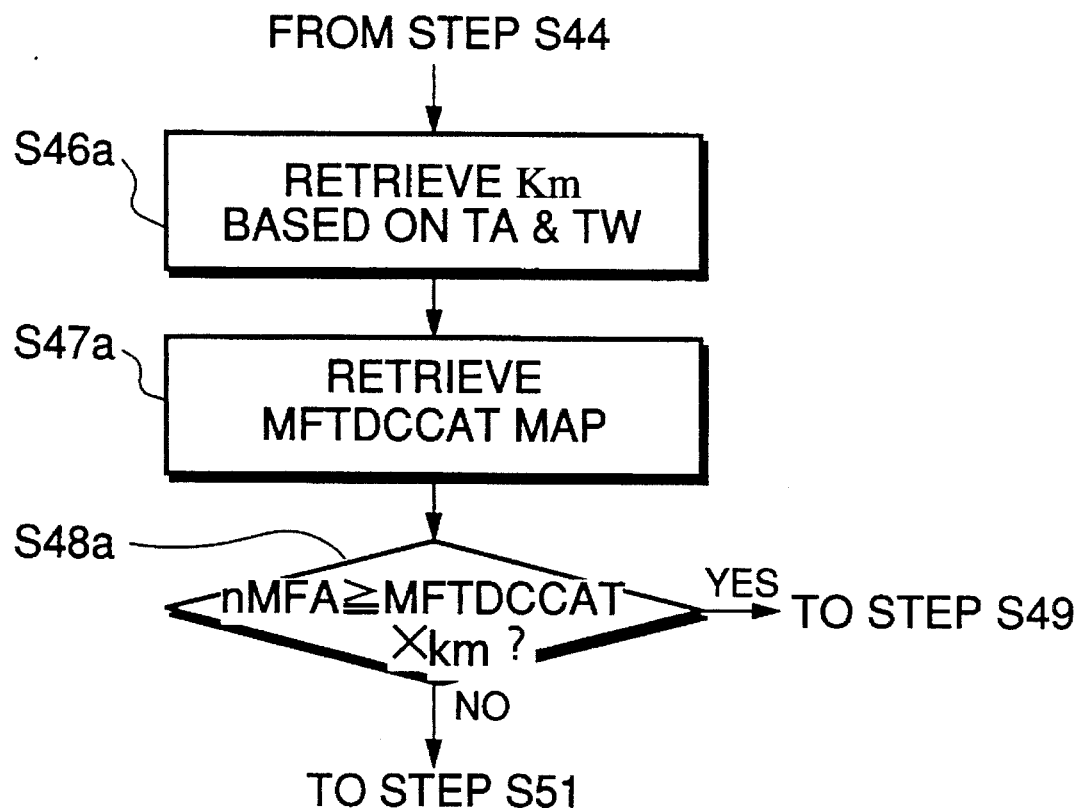
FIG. 11 is a flowchart showing part of a subroutine for determining a combustion state of the engine, according to another embodiment.

FIG. 11 shows part of a program for determining a combustion state of the engine according to another embodiment of the invention, wherein steps other than those shown in the figure are identical with those in FIG. 9, description thereof being omitted.

Figure 12:
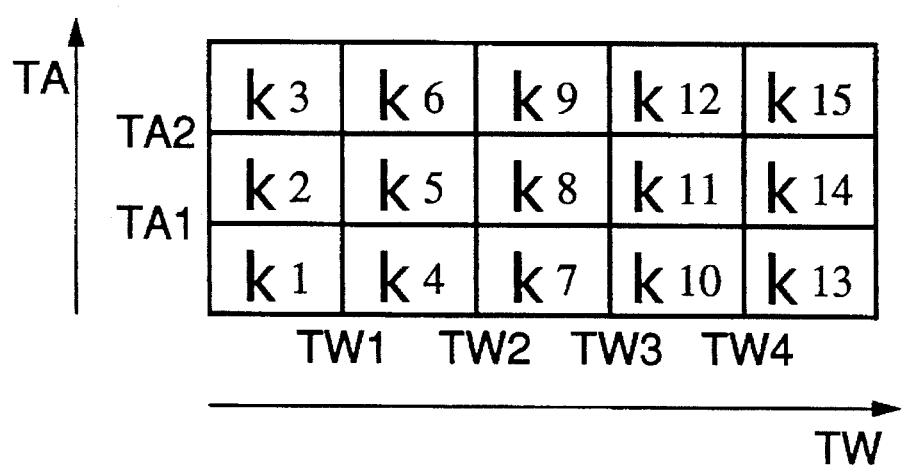
FIG. 12 shows a map which is used to calculate a correction coefficient km of the reference value MFTDC-CAT.

At a step S46a in FIG. 11, a correction coefficient km is read from a map shown in FIG. 12 in accordance with the detected intake air temperature TA and the engine coolant temperature TW. As shown in FIG. 12, predetermined values of the correction coefficient km (m=1 to 15) are arranged in regions which are defined by predetermined values TA1 and TA2, and TW1–TW4 of the temperatures TA and TW, similarly to FIG. 10.

Specifically, with respect to the intake air temperature, the km value is set to larger values in regions where TA≦TA1 or TA>TA2 stands than values in regions where TA1<TA≦TA2 stands. With respect to the engine coolant temperature TW, it is set to larger values in regions where TW≦TW3 or TW>TW4 stands than values in regions where TW3≦TW>TW4 stands. In the regions where TW TW3 stands, the km value is set to larger values as the TW value decreases.

At the following step S47a, the MFTDCCAT map is retrieved in accordance with the engine rotational speed NE and the intake pipe absolute pressure PBA, to thereby determine the first reference value MFTDCCAT. According to the present embodiment, a single MFTDCCAT map is provided, wherein the MFTDCCAT value is determined in accordance with the engine rotational speed NE and the intake pipe absolute pressure PBA.

At a step S48a, it is determined whether or not the count value of the first misfiring counter nMFA is equal to or larger than the product of MFTDCCAT× km. If nMFA≧MFTDCCAT× km stands, the program proceeds to the step 49, whereas if nMFA< MFTDCCAT× km stands, the program proceeds to the step S51.

According to the present embodiment, since the first reference value MFTDCCAT is corrected by the correction coefficient km, i.e. based on the intake air temperature TA and the engine coolant temperature TW, a suitable determination based on the intake air temperature TA and the engine coolant temperature TW can be performed, leading to a similar excellent effect to that obtained by the first embodiment.

What is claimed is:

1. In a combustion state-determining system for an internal combustion engine, including misfire-detecting means for detecting misfires occurring in said engine, misfiring rate-calculating means for calculating a rate of misfire occurrence every predetermined number of firing cycles, based on the misfires detected by said misfire-detecting means, combustion state-determining means for determining that said engine is in a misfiring state when the rate of misfire occurrence, calculated by said misfiring rate-calculating means, exceeds a predetermined reference rate, the improvement comprising:

temperature state-detecting means for detecting a temperature state of said engine; and reference rate-changing means for changing said predetermined reference rate, based on the temperature state of said engine detected by said temperature state-detecting means;

said reference rate-changing means setting said predetermined reference rate to a larger value in one of predetermined low and high temperature regions of the intake air temperature of said engine than a value in a predetermined medium temperature region of the intake air temperature of said engine, and to a larger value in one of predetermined low and high temperature regions of said coolant temperature of said engine than a value in predetermined medium temperature region of said coolant temperature of said engine.

2. A combustion state-determining system as claimed in claim 1, wherein said temperature state-detecting means detects at least one of coolant temperature of said engine and intake air temperature of said engine.

3. A combustion state-determining system as claimed in claim 2, wherein said predetermined reference rate is determined based on operating conditions of said engine.

4. A combustion state-determining system as claimed in claim 1, wherein said reference rate-changing means sets said predetermined reference rate to larger values as the coolant temperature of said engine decreases in said predetermined low temperature region of the coolant temperature of said engine.

* * * * *